United States Patent
Viorel et al.

(10) Patent No.: US 9,167,603 B2
(45) Date of Patent: Oct. 20, 2015

(54) SYSTEM AND METHOD FOR OPTIMIZED ACCESS MESSAGING IN A WIRELESS NETWORK

(71) Applicant: Fujitsu Limited, Kawasaki-shi, Kanagawa (JP)

(72) Inventors: Dorin Gheorghe Viorel, Calgary (CA); Chenxi Zhu, Fairfax, VA (US); Akira Ito, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 257 days.

(21) Appl. No.: 13/720,657

(22) Filed: Dec. 19, 2012

(65) Prior Publication Data

US 2014/0169283 A1     Jun. 19, 2014

(51) Int. Cl.
   H04W 4/00      (2009.01)
   H04W 74/08     (2009.01)
   H04W 84/04     (2009.01)

(52) U.S. Cl.
   CPC .......... *H04W 74/085* (2013.01); *H04W 84/045* (2013.01)

(58) Field of Classification Search
   None
   See application file for complete search history.

(56) References Cited

U.S. PATENT DOCUMENTS

| | | | |
|---|---|---|---|
| 2009/0252075 A1* | 10/2009 | Ji et al. | 370/312 |
| 2010/0008282 A1* | 1/2010 | Bhattad et al. | 370/312 |
| 2010/0222068 A1* | 9/2010 | Gaal et al. | 455/450 |
| 2010/0331030 A1* | 12/2010 | Nory et al. | 455/509 |
| 2011/0143762 A1* | 6/2011 | Zhang et al. | 455/450 |
| 2013/0039195 A1* | 2/2013 | Weng et al. | 370/252 |
| 2013/0077507 A1* | 3/2013 | Yu et al. | 370/252 |
| 2013/0142175 A1* | 6/2013 | Manssour et al. | 370/336 |
| 2013/0242959 A1* | 9/2013 | Bhattad et al. | 370/336 |
| 2013/0250855 A1* | 9/2013 | Bhattad et al. | 370/328 |
| 2013/0286958 A1* | 10/2013 | Liang et al. | 370/329 |
| 2014/0161049 A1* | 6/2014 | Viorel et al. | 370/329 |

FOREIGN PATENT DOCUMENTS

WO    WO 2010/104977      9/2010      ........... H04W 24/02

OTHER PUBLICATIONS

International Search Report and Written Opinion; PCT/US2013/073827; pp. 13, Feb. 24, 2014.
MediaTek; "Inter-cell Interface Mitigation between PRACH and PUCCH/PUSCH in Heterogenous Networks"; 3GPP TSG RAN WG1 Meeting #61bis; pp. 4, 2010.

(Continued)

*Primary Examiner* — Otis L Thompson, Jr.
(74) *Attorney, Agent, or Firm* — Baker Botts L.L.P.

(57) ABSTRACT

A method is provided for managing wireless network traffic that includes designating a first resource block of a macro base station and a second resource block of a small cell base station for access by a physical random access channel (PRACH). The method further includes designating a first random access subframe associated with the first resource block and a second random access subframe associated with the second resource block for access by a random access channel message. The first random access subframe has a first allocation of random access signatures that are configured to receive a plurality of random access requests. The second random access subframe is time-aligned with the first random access subframe and has a second allocation of random access signatures that are configured to receive a plurality of random access requests.

18 Claims, 7 Drawing Sheets

(56) References Cited

OTHER PUBLICATIONS

3GPP TS36.211 v10.5.0 (2012-19); "Evolved Universal Terrestrial Radio Access (E-UTRA). Physical Channels and Modulation"; (Release 10); pp. 106, Sep. 2012.

3GPP TS36.321 v11.0.0 (Sep. 2012); "Evolved Universal Terrestrial Radio Access (E-UTRA). Medium Access Control (MAC) Protocol Specification"; (Release 10); pp. 54, Sep. 2012.

* cited by examiner

SYSTEM AND METHOD FOR OPTIMIZED ACCESS MESSAGING IN A WIRELESS NETWORK

TECHNICAL FIELD

The present disclosure relates generally to wireless networks, and specifically to systems and methods for optimized access messaging in a wireless network.

BACKGROUND

Various wireless technologies (e.g., 3G, 4G, 3GPP Long Term Evolution (LTE), LTE-Advanced (LTE-A), Worldwide Interoperability for Microwave Access (WiMAX), etc.) allow for the use of small base stations, generally referred to herein as small cells (e.g., femto base stations or pico base stations in WiMAX or Home Node B (HeNB), pico base stations or generically designated as small cell base stations in 3GPP LTE specifications). The user or a wireless service provider's technician installs the small cell in the user's home or office to improve the user experience. The small cell's backhaul connection to the wireless service provider's network is provided via the user's network access (e.g., digital subscriber line (DSL) or provided by the wireless carrier). The small cell exhibits a similar wireless behavior (e.g., uses the same air interface protocol) as the wireless service provider's other base stations (e.g., macro base stations (mBSs) and/or relay stations). The small cell may allow for the handover from the mBS to the small cell to be accomplished without the user noticing (e.g., similar to the handover from one mBS to another). Small cells may be useful in machine to machine (M2M) communications that are engineered to communicate with little or no human support. M2M communications in large industrial or machine residential networks may require the connection of over 30,000 machine User Equipment (UE) devices per mBS. Small cells may be able to assist in offloading a main cell's excess data traffic, including M2M traffic, thus increasing the overall cell throughput and improving the user experience. Small cells are expected to enable significant increases in the overall throughput of a macro cell and thus increasing the overall spectrum efficiency of the respective macro cell.

SUMMARY

In accordance with one or more embodiments of the present disclosure, a method is provided for managing wireless network traffic that includes designating a first resource block of a macro base station and a second resource block of a small cell base station for access by a physical random access channel (PRACH). The method further includes designating a first random access subframe associated with the first resource block for access by a random access channel message. The first random access subframe has a first allocation of random access signatures that are configured to receive a plurality of random access requests. The method additionally includes designating a second random access subframe associated with the second resource block for access by a random access channel message. The second random access subframe is time-aligned with the first random access subframe and has a second allocation of random access signatures that are configured to receive a plurality of random access requests.

In accordance with another embodiment of the present disclosure, one or more non-transitory computer-readable media is provided embodying logic that, when executed by a processor, is configured to perform operations that include designating a first resource block of a macro base station and a second resource block of a small cell base station for access by a PRACH. The operations further include designating a first random access subframe associated with the first resource block for access by a random access channel message. The first random access subframe has a first allocation of random access signatures that are configured to receive a plurality of random access requests. The operations additionally include designating a second random access subframe associated with the second resource block for access by a random access channel message. The second random access subframe is time-aligned with the first random access subframe and has a second allocation of random access signatures that are configured to receive a plurality of random access requests.

The object and advantages of the invention will be realized and attained at least by the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
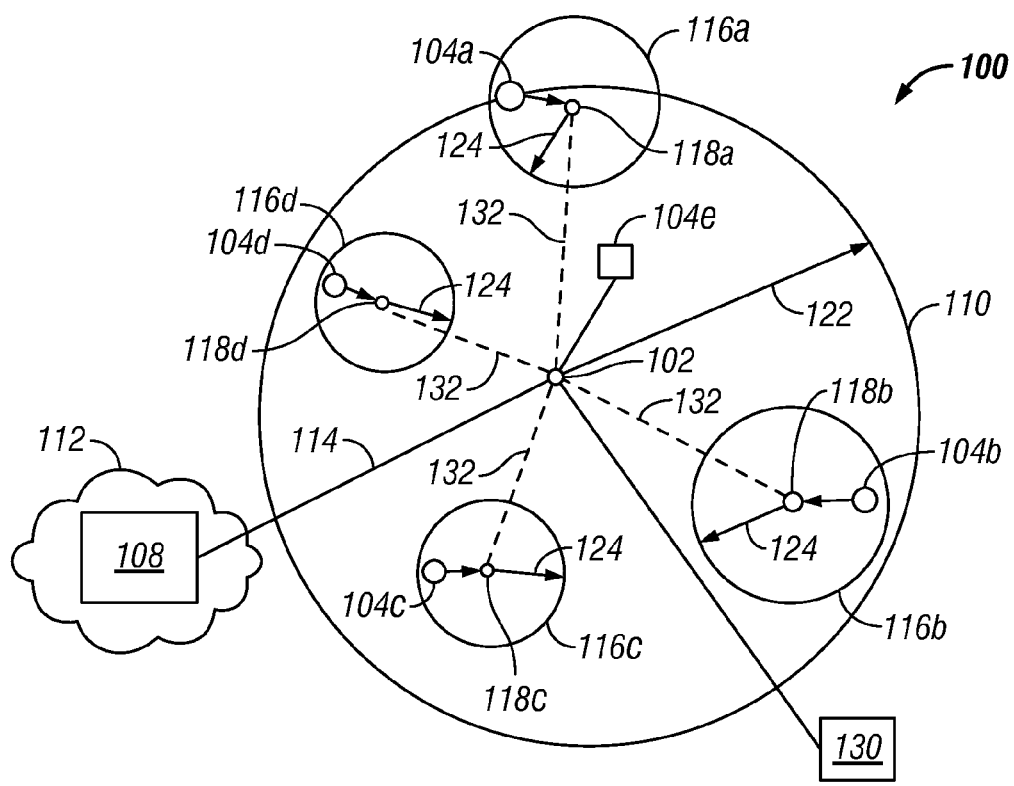
FIG. 1 illustrates an example wireless network using overlaid small cell (OSC) topology, in accordance with one embodiment of the present disclosure.

FIG. 1 illustrates an example wireless network 100 using overlaid small cell (OSCs) topology, in accordance with one embodiment of the present disclosure. Network 100 may include one or more co-located macro base stations (mBS) 102, one or more endpoints 104*a-e* (collectively referred to as endpoints 104). Network 100 may provide wireless coverage for any suitable number of endpoints 104 over a geographic area such as cell 110. For example, mBS 102 may be used to provide wireless coverage for an entire building, a city block, a campus, or any contiguous other area. Cell 110 may have any suitable coverage shape, such as a circular shape depicted in FIG. 1. Cell 110 may also have any suitable size. For example, cell 110 may have radius 122 of approximately three kilometers.

mBS 102 may be configured to communicate with one or more endpoints 104 using wireless communication via one or more ports (not expressly shown). As used herein, mBS 102 may refer to a transmission site, a remote transmission site, a Radio Element Control, an Evolved Node B (eNB), a Baseband Unit, a Radio Element, and/or a Remote Radio Head (RRH). mBS 102 may include any combination of hardware, software embedded in a computer readable medium, and/or encoded logic incorporated in hardware or otherwise stored (e.g., firmware) to implement any number of communication protocols that allow for wired or wireless exchange of information in network 100. mBS 102 may be operable to send control messages and data traffic to endpoints 104. mBS 102 may use any suitable technologies or protocols, e.g., Common Public Radio Interface (CPRI), to communicate with other mBS 102. In some embodiments, mBS 102 may coordinate with other mBS 102 to communicate jointly with endpoint 104.

In some embodiments of the present disclosure, mBS 102 may be installed on a mobile wireless transmission tower such as those operated by mobile wireless service providers. For example, mBS 102 may be configured to transmit mobile wireless data that complies with the 3rd Generation Partnership Project (3GPP) protocols. In the example illustrated in FIG. 1, mBS 102 may be configured to transmit and/or receive wireless data that complies with the Long Term Evolution (LTE) standard. In the same or alternative embodiments, mBS 102 may be configured to transmit and/or receive wirelessly data that complies with other protocols, including later releases of 3GPP or other fourth- (or later) generation protocols such as LTE-Advanced (LTE-A).

mBS 102 may also be coupled to any network or combination of networks capable of transmitting, receiving, and processing signals, data, and/or messages supporting web pages, e-mail, text, chat, voice over IP (VoIP), instant messaging, and/or any other suitable application in order to provide services and support data transmissions to endpoints 104. For example, mBS 102 may be coupled to one or more local area networks (LANs), wide area networks (WANs), metropolitan area networks (MANs), enabling the connection to global distributed networks such as the Internet, or any other form of wireless or wired networking. As an example, mBS 102 may be coupled to a core infrastructure network 112, which may include server 108, via a LAN 114.

Network 100 may also include one or more and one or more small cell base stations (scBS) 118*a-d* (collectively referred to as scBS 118). scBSs 118 may be small cell evolved Node Bs (seNBs), Home evolved Node-B (HeNB), and/or any other suitable devices. In some embodiments of the present disclosure, scBS 118 may be any electronic device configured to switch and/or aggregate mobile wireless data for communication among other devices. In some embodiments of the present disclosure, scBS 118 may include memory and one or more processors configured to execute instructions stored on that memory.

scBS 118 may provide wireless coverage and services for any suitable number of endpoints 104 over a geographic area such as overlaid small cell (OSC) 116*a-d* (collectively referred to as OSCs 116). OSC 116 may be a small cell associated with scBS 118 that may be located wholly or partially within the coverage area of mBS 102, e.g., cell 110. In some embodiments of the present disclosure, OSC 116 may also overlap with multiple neighboring cells 110. OSC 116 may have any suitable coverage shape, such as a circular shape as depicted in FIG. 1. OSC 116 may have any suitable size. For example, OSC 116 may have coverage radius 124 of approximately half of a kilometer. Although OSCs 116*a-d* may be shown in FIG. 1 as having approximately the same size, each OSC 116 may be of any suitable size. In some embodiments of the present disclosure, it may be necessary or desirable for a home or business to have one or more OSC 116 deployed throughout the home or business. In such a manner, a mobile wireless provider may optimize the coverage of the mobile wireless network indoors or to poor coverage areas, which might be more difficult and/or expensive to reach via conventional mobile wireless coverage techniques.

In some embodiments of the present disclosure, scBS 118 may communicate with the mobile wireless provider's core network and/or mBS 102 over a link 132 that may be a wireline link such as digital subscriber line (DSL), optical fiber, or other appropriate wireline link, or an appropriate wireless link. In some embodiments of the present disclosure, this may be beneficial to both the user and the wireless service provider. In some embodiments of the present disclosure, OSC 116 may be a co-channel OSC that operates within mBS 102 broadband spectrum by reusing the same frequency as mBS 102.

Although reference is made above and below with reference to FIGS. 2-8 to LTE as the mobile wireless technology, other technologies, standards, and/or protocols may be implemented without departing from the scope of the present disclosure. For example, the systems and methods described herein may also be applied to worldwide interoperability for microwave access (WiMAX) as another orthogonal frequency-division multiplexing (OFDM) mobile wireless technology communication or other suitable wireless technology.

When OSC 116 is active, the user, the user equipment, the radio access network, or some combination thereof may be able to offload some portion of the mobile wireless data traffic onto the local area network for communication back to the core network. This may have the benefit of lowering the traffic level on mBS 102 as well as improving performance for the user. In some configurations of scBS 118, this "data offload" process may be performed by a number of different approaches.

Endpoints 104 may be any electronic device configured to receive and/or transmit wireless data, messages, and/or signals to and from other endpoints 104, mBS 102, and/or scBS 118. For example, endpoint 104 may be a mobile wireless telephone, tablet computer, laptop computer, desktop computer, PDA, mobile wireless modem, VoIP phone, wireless measurement device, wireless sensor, wireless sensor embedded in a machine, and/or other device configured to communicate with mBS 102 and/or scBS 118. Endpoints 104 may provide data or network services to a human and/or machine user through any suitable combination of hardware, software embedded in a computer readable medium, real-time processing system, and/or encoded logic incorporated in hardware or otherwise stored (e.g., firmware). Endpoints 104 may also include unattended or automated systems, gateways, other intermediate components or other devices that may send or receive data, messages, and/or signals. Various types of information may be sent to or from endpoints 104. As an example, endpoint 104 may send identification data and status data to mBS 102 and/or scBS 118.

In some embodiments, machine to machine (M2M) communications, also known as Machine Type Communications (MTC), may utilize endpoints 104 in the form of machine user equipment (M-UE). M2M networks may have traffic patterns significantly different from human mobile traffic. For example, sensor networks in industrial applications, smart grid/meters in residential utility applications, and/or smart home networks may include large numbers of machine UEs. As another example, in some large industrial applications, network 100 may be required to accommodate large numbers of machine UEs, e.g., up to more than approximately 30,000 devices per cell 110. Network 100 may include only machine UEs in the case of a M2M network, or network 100 may be a mix of human mobile devices, such as mobile wireless handsets, and machine UEs in a human/machine network. Further, machine UEs may exhibit infrequent and/or bursty communication and traffic patterns.

As described in more detail below with reference to FIGS. 2-8, mBS 102 and/or scBS 118 may be configured to execute instructions performing the optimization routines discussed below. In other configurations, responsibilities for various portions may be distributed among the components of network 100.

In some embodiments of the present disclosure, a concentrator 130 may be utilized that may be in communication with mBS 102, server 108, scBS 118, and/or any other suitable equipment. Concentrator 130 may include a processor system, memory, ports, and/or any other suitable components. Concentrator 130 may be configured to gather messages from all endpoints 104 within cell 110 or OSC 116. Concentrator 130 may be configured to address the messages received from endpoints 104, e.g., add headers, to forward the messages onto mBS 102, server 108, scBS 118, and/or any other suitable destination. Further, concentrator 130 may be embedded in or co-located with mBS 102.

Although FIG. 1 illustrates example network 100 as having one mBS 102, multiple endpoints 104, and four scBSs 118, it should be understood that these examples are provided to aid in understanding and any number of any given devices and/or sub-systems may be present in a given configuration without departing from the scope of the present disclosure. It should also be understood that the number of any given component may change over time. For example, the number and identity of endpoints 104 present within range of a given scBS 118 may change over time as users move in and out of scBS 118 coverage.

Further, although FIG. 1 illustrates only one topology of the system comprising mBS 102, endpoints 104, and scBSs 118, a number of such iterations may be present within network 100 without departing from the scope of the present disclosure. For example, there may be a plurality of OSCs 116 present within range of a given cell 110. In other embodiments, network 100 may not include mBS 102. Further, mBS 102 and scBS 118 may be configured to communicate with neighboring mBS 102 and scBS 118.

Figure 2:
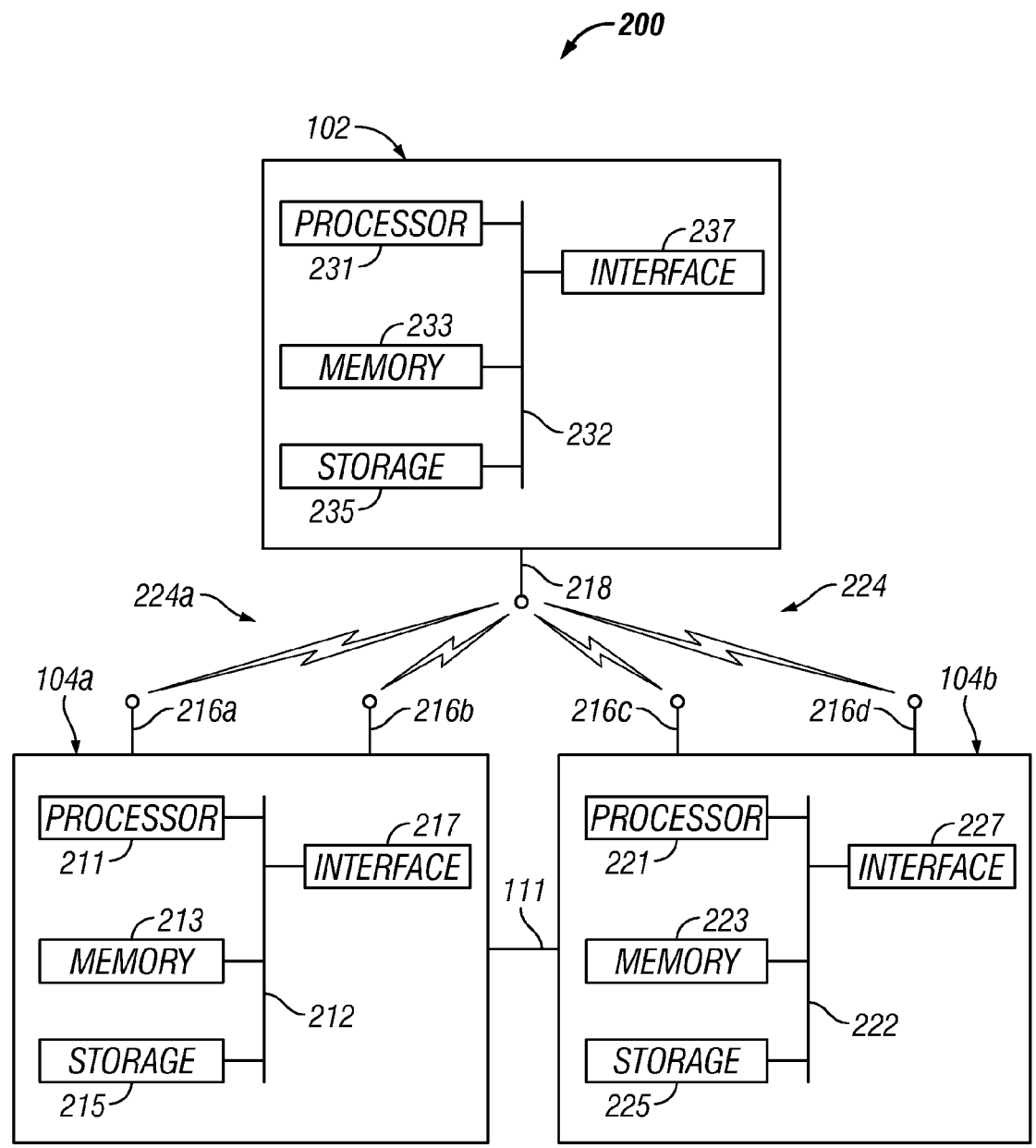
FIG. 2 illustrates example apparatuses that may facilitate the various components of FIG. 1, in accordance with one embodiment of the present disclosure.

FIG. 2 illustrates example apparatuses that may facilitate the operations of various components of FIG. 1, in accordance with one embodiment of the present disclosure. FIG. 2 includes an example communications system 200 with two example endpoints 104 and example mBS 102. Although illustrated utilizing mBS 102, alternatively system 200 may include scBS 118 having the same illustrated components as mBS 102. Communications system 200 may correspond to at least a portion of network 100 of FIG. 1. Endpoints 104 and mBS 102 may each include one or more portions of one or more computer systems.

System 200 may allow for multiple-input/multiple output (MIMO) transmission where multiple antennas are used for transmitting and receiving wireless messages and/or signals. Additionally, system 200 may be configured to perform Coordinated Multi-point Processing (CoMP) to coordinate and combine the transmission of messages and/or signals used in MIMO transmission. The CoMP processing may perform DL CoMP transmission in which multiple mBS 102 jointly communicate with endpoints 104 and/or multiple endpoints 104 communicate with mBS 102.

Endpoints 104 may communicate with mBS 102 using wireless communication via air interface using one or more antenna ports 216. For example, endpoint 104a may communicate with mBS 102 via air interface using antenna ports 216a and 216b. Endpoint 104b may communicate with mBS 102 via air interface using antenna ports 216c and 216d. Endpoints 104 may communicate with mBS 102 using any of a variety of different wireless technologies, including, but not limited to, LTE, and LTE-A protocol as defined in the 3GPP Release 11 or beyond. In some embodiments of the present disclosure, endpoints 104 may coordinate with one more other endpoints 104 to communicate jointly with mBS 102. In such embodiments, endpoints 104 may coordinate with each other to communicate with mBS 102 using a MIMO transmission/reception scheme where multiple transmitting antenna ports 216 may equip different endpoints 104, while one or more transmitting/receiving antenna ports 218 are located at the mBS 102. For example, endpoints 104 may communicate with mBS 102 using a DL and UL CoMP schemes backed by MIMO transmission/reception as defined in 3GPP standards. During such a MIMO transmission, endpoint 104 may wirelessly communicate using multiple layered data streams to mBS 102 via one or more wireless connections between antenna ports 216 and one or more antenna port 218 of mBS 102.

The components of endpoints 104 and mBS 102 may comprise any suitable physical form, configuration, number, type and/or layout. As an example, and not by way of limitation, endpoint 104 and/or mBS 102 may comprise an embedded real-time processing system, computer system, a system-on-chip (SOC), a single-board computer system (SBC) (for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, endpoint 104 and/or mBS 102 may include one or more computer systems or be embedded in a multiple processor system; be unitary or distributed; span multiple locations; span multiple machines; or reside in a cloud, which may include one or more cloud components in one or more networks.

In the depicted embodiment, endpoints 104a and 104b and mBS 102 each include their own respective processor system 211, 221, and 231; memory system 213, 223, and 233; storage 215, 225, and 235; interface 217, 227, and 237; and bus 212, 222, and 232. Although a particular wireless communications system is depicted having a particular number of particular components in a particular arrangement, this disclosure contemplates any suitable wireless communications system 200 having any suitable number of any suitable components in any suitable arrangement. For simplicity, similar components of endpoints 104a, 104b and mBS 102 will be discussed together. However, it is not necessary for these devices to have the same components, or the same type of components, or be configured in the same manner. For example, processor system 211 may be implemented as an application specific integrated circuit (ASIC) or System-on-Chip (SoC).

Processor systems 211, 221 and 231 may include one or more microprocessors, controllers, or any other suitable computing device, resource, or combination of hardware, software and/or encoded logic based on a real time operating system (RTOS) operable to provide, either alone or in conjunction with other components (e.g., memory systems 213, 223, and 233, respectively), wireless networking functionality. Such functionality may include supporting various wireless features discussed herein. For example, processor system 231 may be configured to analyze and/or process data, messages, and/or signals communicated between mBS 102 and endpoints 104 via channels 224. Further, processor systems 211 and 221 of endpoints 104a and 104b may be configured to analyze messages, signals, and/or data communicated from mBS 102 via channels 224.

In some embodiments, processor systems 211, 221, and 231 may include hardware for executing instructions, such as those making up a computer program and/or real time instructions supported by a RTOS. As an example, and not by way of limitation, to execute instructions, processor systems 211, 221, and 231 may retrieve (or fetch) instructions from an internal register, an internal cache, memory systems 213, 223, or 233, respectively, or storage 215, 225 or 235, respectively; decode and execute them; and then write one or more results to an internal register, an internal cache, memory systems 213, 223, or 233, respectively, or storage 215, 225, or 235, respectively.

In some embodiments, processor systems 211, 221, and 231 may include one or more internal caches for data, instructions, or addresses. This disclosure contemplates processor systems 211, 221, and 231 including any suitable number of any suitable internal caches, where appropriate. As an example, and not by way of limitation, processor systems 211, 221, and 231 may include one or more instruction caches, one or more data caches, and one or more translation lookaside buffers (TLBs) and/or multiple layered buffers. Instructions in the instruction caches may be copies of instructions in memory systems 213, 223, or 233, respectively, or storage 215, 225, or 235, respectively, and the instruction caches may speed up retrieval of those instructions by processor systems 211, 221, or 231, respectively. Data in the data caches may be copies of data in memory systems 213, 223, or 233, respectively, or storage 215, 225, or 235, respectively, for instructions executing at processor systems 211, 221, or 231, respectively, to operate on; the results of previous instructions executed at processor systems 211, 221, or 231 for access by subsequent instructions executing at processor systems 211, 221, or 231, or for writing to memory systems 213, 223, or 233, respectively, or storage 215, 225, or 235, respectively; or other suitable data. The data caches may speed up read or write operations by processor systems 211, 221, or 231. The multiple layered buffers may speed up virtual-address translations for processor systems 211, 221, or 231. In some embodiments, processor systems 211, 221, and 231 may include one or more internal registers for data, instructions, or addresses. Depending on the embodiment, processor systems 211, 221, and 231 may include any suitable number of any suitable internal registers, where appropriate. Where appropriate, processor systems 211, 221, and 231 may include one or more arithmetic logic units (ALUs); be a multi-core processor; include one or more processor systems 211; or any other suitable processor.

Memory systems 213, 223, or 233 may be any form of volatile or non-volatile memory including, without limitation, magnetic media, optical media, random access memory (RAM), read-only memory (ROM), flash memory, removable media, or any other suitable local or remote memory component or components. In some embodiments, memory systems 213, 223, or 233 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory systems 213, 223, or 233 may include one or more memories 213, 223, or 233, respectively, where appropriate. Memory systems 213, 223, or 233 may store any suitable data or information utilized by endpoints 104a, 104b, or mBS 102, respectively, including software embedded in a computer readable medium, and/or encoded logic incorporated in hardware or otherwise stored (e.g., firmware). In some embodiments, memory systems 213, 223, or 233 may include main memory for storing instructions for processor systems 211, 221, or 231, respectively, to execute or data for processor systems 211, 221, or 231 to operate on. In some embodiments, one or more memory management units (MMUs) may reside between processor systems 211, 221, or 231 and memory systems 213, 223, or 233, respectively, and facilitate accesses to memory systems 213, 223, or 233 requested by processor systems 211, 221, or 231, respectively.

As an example, and not by way of limitation, endpoints 104a, 104b, or mBS 102 may load instructions and/or addresses from storage 215, 225, or 235, respectively, or another source (such as, for example, another computer system, another base station, or a remote transmission site) to memory systems 213, 223, or 233, respectively. Processor systems 211, 221, or 231 may then load the instructions from memory systems 213, 223, or 233, respectively, to an internal register or internal cache. To execute the instructions, processor systems 211, 221, or 231 may retrieve the instructions from the internal register or internal cache and decode them. During or after execution of the instructions, processor systems 211, 221, or 231 may write one or more results (which may be intermediate or final results) to the internal register or internal cache. Processor systems 211, 221, or 231 may then write one or more of those results to memory systems 213, 223, or 233, respectively. In some embodiments, processor systems 211, 221, or 231 may execute only instructions in one or more internal registers and/or internal caches or in memory systems 213, 223, or 233, respectively (as opposed to storage 215, 225, or 235, respectively, or elsewhere), and may operate only on data in one or more internal registers or internal caches or in memory systems 213, 223, or 233, respectively (as opposed to storage 215, 225, or 235, respectively, or elsewhere).

In some embodiments, storage 215, 225, or 235 may include mass storage for data, instructions, and/or addresses. As an example, and not by way of limitation, storage 215, 225, or 235 may include a hard disk drive (HDD), a floppy disk drive, flash memory, an optical disc, a magneto-optical disc, magnetic tape, or a Universal Serial Bus (USB) drive or a combination of two or more of these. Storage 215, 225, or 235 may include removable or non-removable (or fixed) media, where appropriate. In some embodiments, storage 215, 225, or 235 may be non-volatile, solid-state memory. In some embodiments, storage 215, 225, or 235 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215, 225, or 235 may take any suitable physical form and may comprise any suitable number or type of storage. Storage 215, 225, or 235 may include one or more storage control units facilitating communication between processor systems 211, 221, or 231, respectively, and storage 215, 225, or 235, respectively, where appropriate.

In some embodiments, interfaces 217, 227, or 237 may include hardware, encoded software, or both providing one or more interfaces for communication (such as, for example, packet-based communication) between endpoints 104, mBS 102, any networks, any network devices, and/or any other computer systems. As an example, and not by way of limitation, communication interface 217, 227, or 237 may include a network interface controller (NIC) or network adapter for communicating with an Ethernet or other wire-based network and/or a wireless NIC (WNIC) or wireless adapter for communicating with a wireless network.

In some embodiments, interfaces 217 or 227 comprise one or more radios (or radio transceivers) coupled to one or more antenna ports 216. In such an embodiment, interface 217 or 227 receives digital data that is to be sent out to wireless devices, such as mBS 102, via a wireless connection. The radio transceivers may convert the digital data into a radio signal having the appropriate center frequency, bandwidth, transmission power, and/or other suitable interface parameters. Similarly, the radio transceivers may convert radio signals received via one or more receiving antennas into digital data to be processed by, for example, processor systems 211 or 221, respectively. Interface 237 of mBS 102 may be configured to perform similar operations via processor system 231 and antenna port 218.

Depending on the embodiment, interface 217, 227, or 237 may be any type of interface suitable for any type of network for which communications system 200 is used. As an example, and not by way of limitation, communications system 200 may be coupled to a supporting core network, an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communications system 200 may communicate with a wireless PAN (WPAN) (such as, for example, a BLUETOOTH WPAN), a WI-FI network, a WI-MAX network, an LTE network, an LTE-A network, a mobile wireless telephone and/or data network (for example, a Global System for Mobile Communications (GSM) network), or any other suitable wireless network or a combination of two or more of these. Endpoints 104a, 104b, and mBS 102 may include any suitable interface 217, 227, or 237, respectively, for any one or more of these networks, where appropriate.

In some embodiments, interface 217, 227, or 237 may include one or more interfaces for one or more I/O devices. One or more of these I/O devices may enable communication between a person and endpoints 104 and/or mBS 102. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Some embodiments may include any suitable type and/or number of I/O devices and any suitable type and/or number of interface 217, 227, or 237 for them. Where appropriate, interface 217, 227, or 237 may include one or more drivers enabling processor systems 211, 221, or 231, respectively, to drive one or more of these I/O devices. Interface 217, 227, or 237 may be coupled to radio transceivers where appropriate.

Bus 212, 222, or 232 may be single or multiple threaded and may include any suitable combination of hardware, software embedded in a computer readable medium, and/or encoded logic incorporated in hardware or otherwise stored (e.g., firmware) to couple components of endpoint 104 and mBS 102 to each other. As an example, and not by way of limitation, bus 212, 222, or 232 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212, 222, or 232 may include any number, type, and/or configuration of bus 212, 222, or 232, where appropriate. In some embodiments, one or more buses 212, 222, or 232 (which may each include an address bus and a data bus) may couple processor systems 211, 221, or 231, respectively, to memory systems 213, 223, or 233, respectively. Bus 212, 222, or 232 may include one or more memory buses, and may be specialized and dedicated multi-threaded busses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Some embodiments may include one or more computer-readable storage media implementing any suitable storage. In some embodiments, a computer-readable storage medium implements one or more portions of processor systems 211, 221, or 231 (such as, for example, one or more internal registers or caches), one or more portions of memory systems 213, 223, or 233, one or more portions of storage 215, 225, or 235, or a combination of these, where appropriate. In some embodiments, a computer-readable storage medium implements RAM or ROM. In some embodiments, a computer-readable storage medium implements volatile or persistent memory. In some embodiments, one or more computer-readable storage media embody encoded software.

Herein, reference to encoded software may encompass one or more applications, bytecode, one or more computer programs, one or more executables, one or more instructions, logic, machine code, one or more scripts, one or more RTOS routines, or source code, and vice versa, where appropriate, that have been stored or encoded in a computer-readable storage medium. In some embodiments, encoded software includes one or more application programming interfaces (APIs) stored or encoded in a computer-readable storage medium. Some embodiments may use any suitable encoded software written or otherwise expressed in any suitable programming language or combination of programming languages stored or encoded in any suitable type or number of computer-readable storage media. In some embodiments, encoded software may be expressed as source code or object code. In some embodiments, encoded software is expressed in a RTOS programming higher-level programming language, such as, for example, C, Perl, or a suitable extension thereof. In some embodiments, encoded software is expressed in a lower-level programming language, such as assembly language (or machine code). In some embodiments, encoded software is expressed in JAVA. In some embodiments, encoded software is expressed in Hyper Text Markup Language (HTML), Extensible Markup Language (XML), real time OS (RTOS), or other suitable markup language.

Accordingly, the above-mentioned components of endpoints 104 and mBS 102 may enable endpoints 104 and mBS 102 to perform operations such as joint data link transmission according to the present disclosure. Modifications, additions, or omissions may be made to FIG. 2 without departing from the scope of the present disclosure. For example, any of the options or features described herein may be utilized in combination with the illustrated embodiments of FIGS. 1 and 2 and/or any number of the other options or features also described herein as would be understood by one of ordinary skill in the art. As another example, mBS 102 may include one or more real time physical (PHY) layer processors, which may be further connected to one or more PHY/media access control (MAC) co-processors coupled to a fast access RAM and a permanent ROM memory. The real time PHY processor may be configured to process a plurality of messages stored into one or more subframes received from one or more endpoints 104.

A network access request (e.g., message and/or user packet request) transmitted by endpoints 104 may be sent using a Random Access Channel (RACH) backed by a Physical Random Access Channel (PRACH). A PRACH may be a shared channel used for initial network access between endpoint 104 and mBS 102 and/or scBS 118. A PRACH may also be utilized for communication of unscheduled access related messages such as when endpoint 104 exits sleep mode, loses power, attempts to connect to the network, or executes a handover. Thus, for example, the PRACH may be used to transmit a last gasp message (LGM), mass scale event triggered (MSET) device identification, and/or other message from endpoints 104 to mBS 102 and/or scBS 118 across and/or utilizing an LTE, LTE-A network, or other wireless network. During M2M mass event scenarios, (e.g., after a large scale power outage scenario) impacting most or all endpoints 104 connected to mBS 102 and/or scBS 118, the related network 100, and particularly PRACH, may be overloaded when the mass event resolves, e.g., power is returned. Additionally, network 100 may be unable to identify particular endpoints 104 that are involved in the mass event. When large numbers of endpoints 104 attempt to access the network simultaneously, the access channel, including a RACH/PRACH, may be overloaded. If the PRACH becomes overloaded when, then messages sent from endpoints 104 attempting to reconnect to mBS 102 and/or scBS 118 may collide and some or most endpoints 104 may be unable to connect to network 100.

The PRACH may be a specific access channel used for PHY layer messages. Further, the PRACH may be based on a Zadoff-Chu (ZC) function. A ZC function may exhibit auto-correlation, cross-correlation and constant amplitude zero autocorrelation (CAZAC) properties. A ZC function may have a set number of total roots, $N_{ZC}$. For example, in an LTE implementation, the ZC function may have eight hundred and thirty-nine roots or $N_{ZC}=839$. The particular root for a message may be designated as "n." In operation, for example, if a particular endpoint 104 transmits over a PRACH with a root of five hundred and eleven, e.g., n=511, then a correlation decoder on mBS 102 and/or scBS 118 may detect only noise during scanning until it reaches root five hundred and eleven where mBS 102 and/or scBS 118 may detect a voltage spike, or "needle" like waveform, that may indicate a message from that particular endpoint 104. Thus, PRACH protocol may identify the respective endpoint 104. Additionally, a cyclically time-shifted ZC root may exhibit the same auto-correlation properties as the main ZC root ($N_{ZC}$). A time shift may be designated as $N_{CS}$.

Additionally, in digital communications, such as communication over a air interface (e.g., a wireless network and/or network 100 of FIG. 1) random access signature (also referred to as "signatures") may be a sequence of randomly selected bit sequences out of a pool of known bit sequences included in random access subframes to synchronize endpoints 104 in time and frequency with mBS 102 and/or scBS 118. mBS 102 and/or scBS 118 may utilize or process random access signatures when receiving access transmission requests from endpoint 104. The pool of access sequences may be known to the endpoint, which may select randomly one of the random access signatures to transmit to the base station. Further, in one embodiment, one random access subframe (discussed with reference to FIG. 3 below) may include up to sixty-four signatures. In some embodiments of the present disclosure, as endpoints 104 communicate with mBS 102, up to sixty-four random access signatures may be processed by mBS 102 and/or scBS 118 within one random access subframe. A set of random access signatures may be termed a "random access set" or a "signature set," and may correspond to one ZC root and/or one or more $Nzc/N_{CS}$ signatures in the case of scBS 118.

Figure 3:
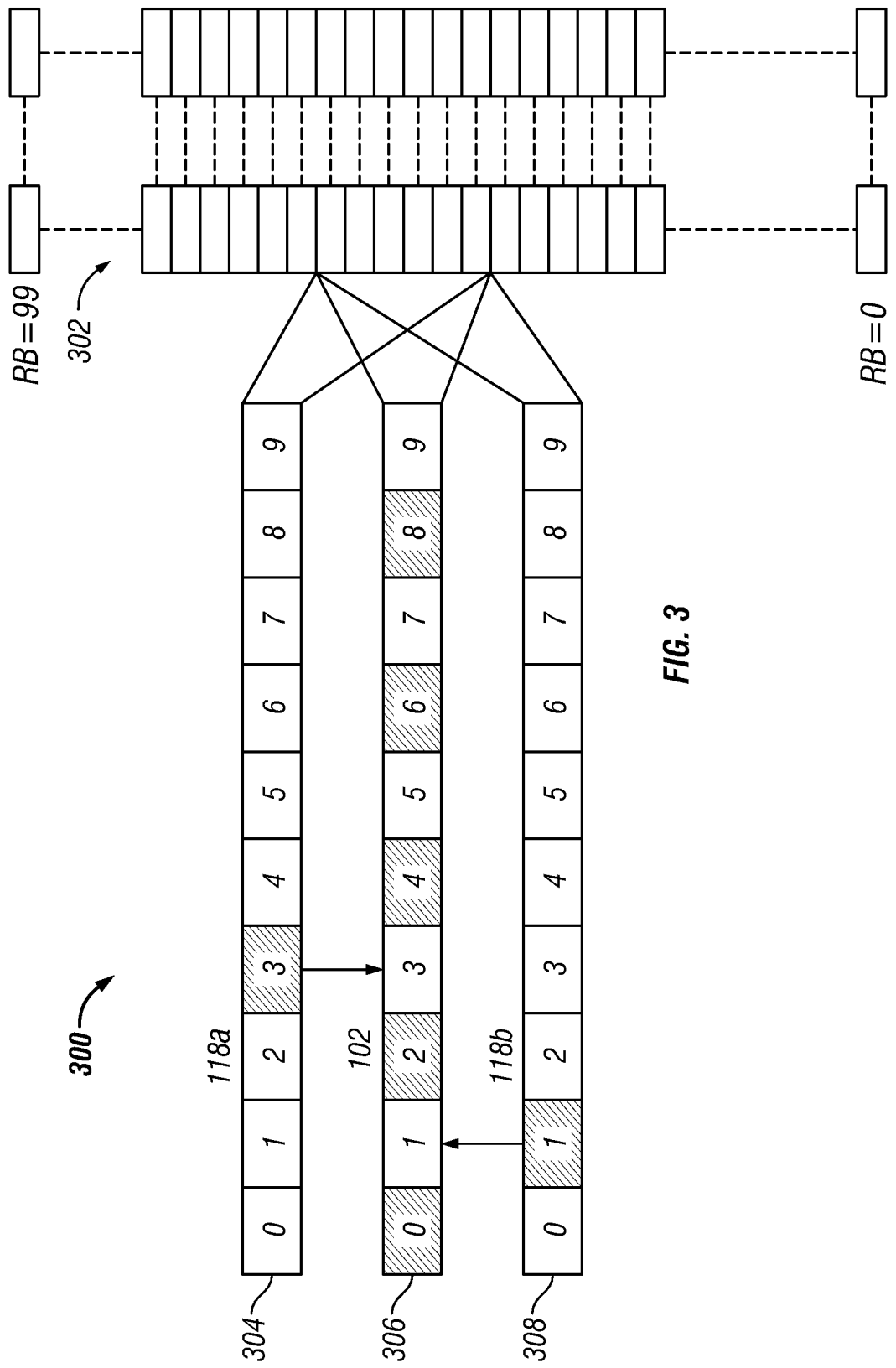
FIG. 3 illustrates an example allocation in a plurality of non-time-aligned random access subframes as part of time-aligned resource blocks utilized by base stations located in the same vicinity, in accordance with one embodiment of the present disclosure.

FIG. 3 illustrates an example allocation 300 in a plurality of non-time-aligned random access subframes as part of time-aligned resource blocks 302 utilized by base stations located in the same vicinity, in accordance with one embodiment of the present disclosure. Resource blocks 302 of bandwidth operating on the same frequency may be re-used by one or multiple mBS 102 and/or scBS 118. Example allocation 300 may be understood to represent multiple resource blocks allocated in time and frequency domains for a group of three base stations located in the same vicinity. For example, a LTE channel bandwidth of twenty MHz may include one hundred resource blocks 302. In the example allocation 300, the middle resource blocks may be partially designated for PRACH access. For example, in a set of one hundred resource blocks, the central resource blocks (forty-seven through fifty-two) may be designated with priority for PRACH access until fully occupied by PRACH subframes. Each frame of the central resource blocks may be further divided into subframes that may correspond to a certain time duration. For example, resource block 304 may have ten subframes numbered zero through nine, each subframe corresponding to one millisecond of time duration. Each subframe may be assigned a particular purpose, such as a random access subframe. A random access subframe may correspond to a data communication request (e.g., a request or transmission of a packet of data or other information) between endpoints 104 and mBS 102 and/or scBS 118.

In some embodiments of the present disclosure, certain subframes on the resource blocks designated for PRACH access may be designated for particular types of access. As an example, in allocation 300, scBS 119a may designate resource block 304 subframe three for PRACH access, and the remaining subframes for standard data traffic. As another example, mBS 102 may designated resource block 306 subframes zero, two, four, six, and eight for PRACH access and the remaining subframes for standard data traffic. Further, scBS 118b may designate resource block 308 subframe one for PRACH access and the remaining subframes for standard data traffic. In a co-channel OSC configuration (as discussed in detail below with reference to FIG. 6), in which all resource blocks modulate the same frequency carrier, PRACH subframes may not be time aligned for all mBS 102 and scBSs 118. In this case, endpoints 104 attempting to access scBS 118a (resource block 304) on subframe three may interfere with a data transmission being received on subframe three of neighboring mBS 102 (subject to an interference path as discussed below with reference to FIG. 5), shown as resource block 306. As another example, subframe three of resource block 306 may be allocated for user data traffic. In this case, a random access signal may be transmitted over subframe three of resource block 306 by an endpoint 104 intended for a neighboring base station (e.g., scBS 118a or 118b). The random access signal may interfere with data signals received on the same subframe of resource block 304 by scBS 118b (e.g., subframe three) and may possibly render the data unusable. Accordingly, time alignment of PRACH subframes may support autocorrelation and cross correlation of a PRACH ZC function. Time alignment may enable simultaneous operation across the same random access subframes as long as different sets of ZC roots or signatures are enabled.

Figure 4:
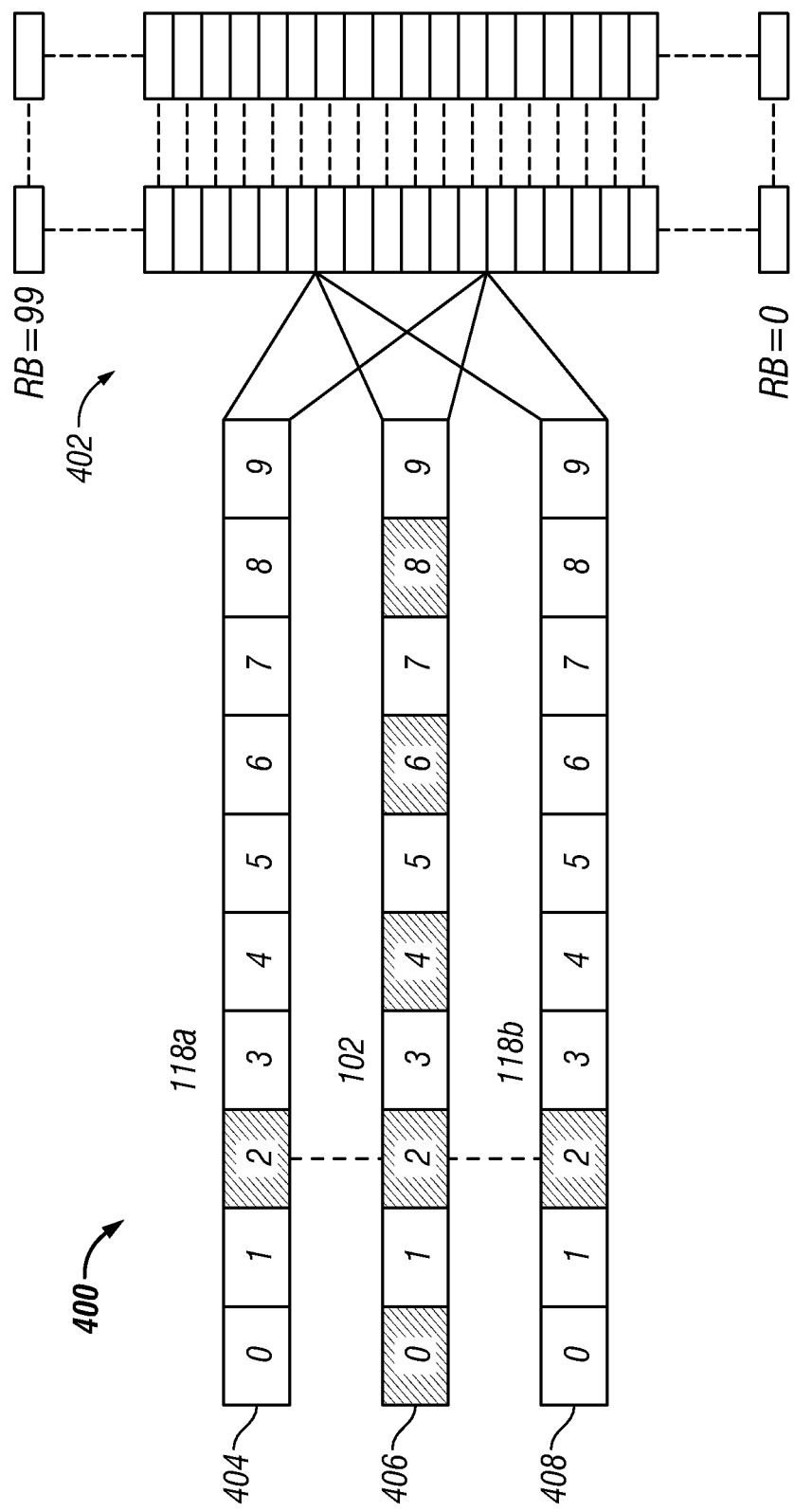
FIG. 4 illustrates an example allocation in a plurality of time-aligned random access subframes and resource blocks utilized by base stations located in the same vicinity, in accordance with one embodiment of the present disclosure.

FIG. 4 illustrates an example allocation 400 in a plurality of time-aligned random access subframes and resource blocks 402 utilized by base stations located in the same vicinity, in accordance with one embodiment of the present disclosure. Resource blocks 402 of bandwidth operating on the same frequency carrier may be shared by one or multiple mBS 102 and/or scBS 118. Example allocation 400 may be understood to represent multiple resource blocks, which may be time-aligned and may utilize the same intra-band frequency resources, and may be used simultaneously by base stations, such as, mBS 102 and/or scBS 118, located in the same vicinity. In some embodiments of the present disclosure, resource block 404 for scBS 118a, resource block 406 for mBS 102, and resource block 408 for scBS 118b may all be time-aligned and may re-use the same intra-band frequency resources such that subframe two may be designated for PRACH access for each resource block 404, 406, and 408. Random access subframe alignment may avoid or mitigate the interference between random access and data subframes when received by a particular base station. Subframes for a particular type of access may be assigned statically or dynamically. Dynamic assignment may allow the subframes allocated to PRACH access to change over time as configured by the network and may be based in part on the number of endpoints 104 per cell. The number of RACH messages may be monitored via a PRACH collision rate. As the PRACH collision rate increases, more subframes may be designated for PRACH access. Thus, in a network utilizing base stations on the same frequency carrier, PRACH subframes may be time-aligned for all mBS 102 and scBS 118 that may also re-use the same intra-band frequency resources.

Figure 5:
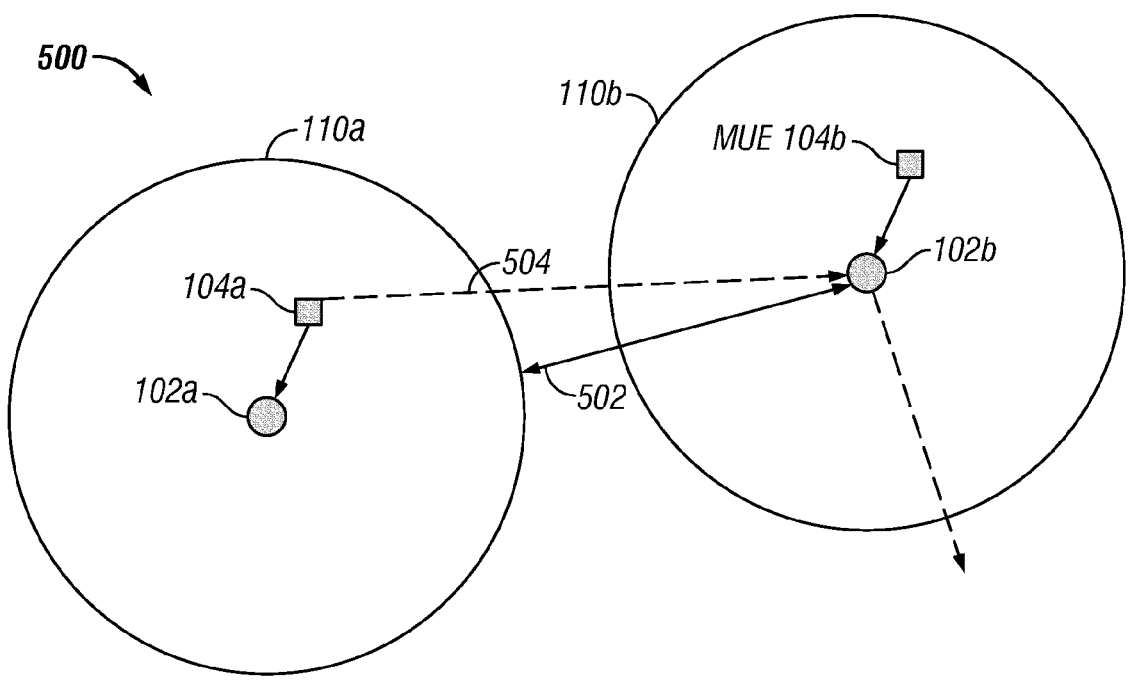
FIG. 5 illustrates an example configuration of multiple macro base stations (mBSs) and a physical random access channel (PRACH) immunity radius in the case where multiple mBSs re-use the same PRACH random access signature set, in accordance with one embodiment of the present disclosure.

FIG. 5 illustrates an example configuration 500 of multiple mBSs 102 and PRACH immunity radius 502, in accordance with one embodiment of the present disclosure. Configuration 500 may include mBS 102a and mBS 102b. Each mBS 102a and 102b may have an associated cell 110a and 110b, respectively. In some embodiments of the present disclosure, multiple endpoints 104 may be located in each cell 110. In operation of the present example, when endpoint 104a accesses over the PRACH mBS 102a, the PRACH transmission may also reach mBS 102b via interference path 504. Interference path 504 between endpoint 104a and mBS 102b may be termed the "PRACH interference path." In order to reduce or eliminate this interference, the path loss of interference path 504 should be greater than the related line-of-sight path loss able to trigger a signal on mBS 102b. If the loss of interference path 504 is not sufficient, a collision may occur when endpoint 104b accesses mBS 102b employing the same signature as endpoints 104a. In order for a collision to occur, endpoints 104a and 104b may need to utilize the same ZC root and Nzc/$N_{CS}$ signature within the same time aligned random access subframe. A collision may delay the access of endpoints 104a and 104b. Immunity radius 502 may be the distance between a particular target mBS 102 and the closest edge of another cell 110 that both employ the same random access signature set, e.g., Nzc/$N_{CS}$ signature, such that no PRACH interference may be created. For example, immunity radius 502 may be the distance needed between mBS 102b and the closest edge of cell 110a if mBS 102a and mBS 102b receive on the same random access subframe the same random access signature sets from endpoints 104a and 104b, respectively, without causing any mutual access collisions.

Figure 6:
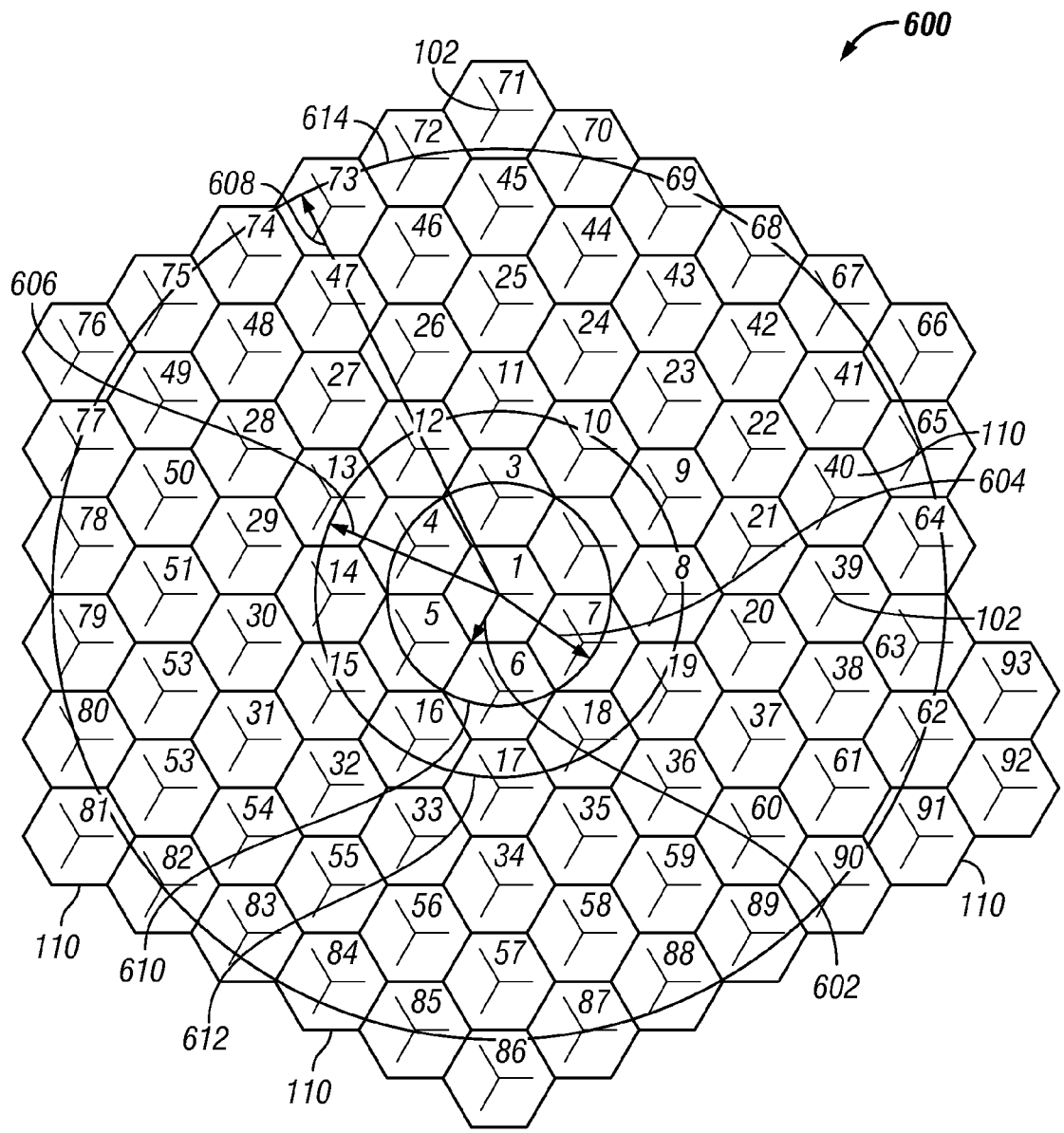
FIG. 6 illustrates an example of a cluster of cells with multiple immunity radii, in accordance with one embodiment of the present disclosure.

FIG. 6 illustrates an example of cluster 600 of cells 110 with multiple immunity radii, in accordance with one embodiment of the present disclosure. Cluster 600 may include a honeycomb cluster of hexagonal shaped cells 110. Each cell 110 located in cluster 400 may be numbered one through ninety-three proceeding counter-clockwise beginning with the center cell. Although not individually referenced, each numbered hexagonal shaped cell 110 may include mBS 102 and one or more OSC 116, as illustrated with reference to FIG. 1.

In some embodiments of the present disclosure, each cell 110 may be configured in a co-channel OSC topology such that each OSC 116 may utilize its own random access signature set. For simplicity, it may be assumed that each OSC 116 may have a radius of approximately one half of a kilometer. Each OSC 116 may employ one PRACH signature set. Depending on the number of OSCs 116 in each cell 110, the entire amount of random access signature sets may be used. Use of the entire pool of signature sets across a cluster of cells with an external radius smaller than the equivalent PRACH immunity radius may lead to PRACH signature pool depletion and increased RACH message collisions. For example, the number of ZC roots may be calculated by first assuming that a single mBS 102 may require three ZC roots based on radius 402 of approximately three kilometers. Each scBS 118 may require one ZC root based on a radius of approximately one half of a kilometer. Thus, ten OSCs 116 located in cell 110 may require ten ZC roots. Accordingly, the total amount of ZC roots for an approximately three kilometer cell 110 based on one mBS 102 and ten OSCs 116 may be thirteen. Additionally, cell 110 may be configured to employ a set of three co-located mBSs 102 in which each mBS 102 covers approximately one hundred and twenty degrees of the overall cell 110 coverage area. Therefore, the total required ZC roots per cell 110 may be thirty-nine. As noted previously, there may be a total of eight hundred and thirty-nine ZC roots. Thus, reuse of ZC roots may occur in a cluster grouping of approximately twenty-one cells 110, e.g., 21×39=819 ZC roots, which is less than eight-hundred and thirty-nine.

In some embodiments of the present disclosure, cluster 600 may be divided into clusters, also called "tiers," as illustrated in FIG. 6 that may be based in part on the immunity radius and/or the average number of OSC 116 per cell 110. One cluster 610 of cells 110 may correspond to a center cell 110, having a radius 602 of R, and directly adjacent similarly sized cells 110. Cluster 610 may have a total radius 604 of approximately 2R. In the current example, if radius 602 is approximately three kilometers, then the radius of cluster 610 may be approximately six kilometers. A second cluster 612 may have a radius 606 of approximately 3.7R, and a third cluster 614 may have a corresponding radius 608 of 8R.

In some embodiments of the present disclosure, for example, each cell 110 may include approximately sixteen OSCs 116 operating in a co-channel topology. The overall pool of PRACH signatures, e.g. ZC roots, may be exhausted across cluster 612 of cells 110 with radius 606 or approximately 3.7R. In this example, the equivalent cluster of cells comprise approximately fourteen cells 110, e.g., 19 signatures×3 co-located mBS=57 ZC roots and 839 max ZC roots/57 ZC roots is approximately fourteen. Based on the following mathematical relationship:

MaxINT(839/57)=14.

Thus, for sixteen OSCs 116 per cell 110 operating in a co-channel topology, the cell cluster size may be approximately fourteen. This cell cluster size may equate to a PRACH immunity radius of approximately 3.7R, or radius 606.

As another example, each cell 110 may include approximately thirty-two OSCs 116 operating in a co-channel topology. The overall pool of PRACH signatures, e.g. ZC roots, may be exhausted across cluster 610 of cells 110 with radius 604 or approximately 2R. In this example, the equivalent cluster of cells comprised approximately nine cells 110, e.g., 35 signatures×3 co-located mBS=105 ZC roots and 839 max ZC roots/105 ZC roots is approximately eight, based on the following relationship:

MaxINT(839/105)=8.

Thus, for thirty-two OSCs 116 per cell 110 operating in a co-channel topology, the cell cluster size may be approximately eight. This cell cluster size may equate to a PRACH immunity radius of approximately 2R, or radius 604.

In some embodiments of the present disclosure, reuse of the same ZC roots or signatures inside a PRACH Immunity Radius may degrade the ZC auto-correlation performance and may cause access delays for endpoints 104. Thus, the available amount of ZC roots may be depleted when co-channel OSC topology is employed due to the assignment of one ZC root per OSC in dense OSC topologies. The comparative random access signature pool depletion rate in a co-channel configuration may be summarized as shown in the following table:

TABLE 1

|  | A. | B. | C. | D. |
|---|---|---|---|---|
| Number of OSC 116/Cell 110 | 0 | 8 | 16 | 32 |
| ZC Roots/mBS | 3 | 11 | 19 | 35 |
| ZC Roots/co-located mBS | 9 | 33 | 57 | 105 |
| OSC cluster size without PRACH signature set re-use | 93 | 25 | 14 | 8 |
| PRACH Immunity Radius | 8 R | 3.7 R | 3.7 R | 2 R |

As noted with reference to FIG. 5, the PRACH immunity radius may represent the distance before a random access signature set may have to be reused within the same frequency channel for the same wireless protocol. For example, in a configuration, such as described in example B. above, the PRACH random access signature sets may require reuse after approximately twenty-five cells 110. Thus, the PRACH immunity radius may correspond to cluster 612 and radius 606 or approximately 3.7R. As another example, a configuration, such as described in example D. above, the PRACH signature sets may require reuse after only approximately eight cells 110. Thus, the PRACH immunity radius may correspond to cluster 610 and radius 604 or approximately 2R. Accordingly, in certain embodiments of the present disclosure, the random access signature set depletion rate may be influenced by the number of OSCs 116 installed per cell 110.

As discussed with reference to FIG. 3, some embodiments of the present disclosure may include up to sixty-four PRACH signatures per random access subframe. As endpoints 104 communicate with mBS 102 and/or scBS 118, sixty-four signatures may be processed by mBS 102 and/or scBS 118 within one random access subframe. Further, a signature of a ZC function may be a specific time shift ($N_{CS}$) for a given ZC root. In some embodiments, a LTE PRACH sequence may be built by cyclically shifting a ZC sequence of prime length Nzc, defined as:

$$x_u(n) = \exp\left[-j\frac{\Pi un(n+1)}{N_{ZC}}\right], 0 \le n \le N_{ZC} - 1$$

where:
u=the ZC index;
n=a particular root for a message; and
Nzc=839.

For a small cell (e.g., OSC 116 having a radius of less than approximately 0.79 kilometers), one ZC root may have up to sixty-four signatures. Under this assumption, signature logical indexes may be assigned to a PHY time cyclical shift ($N_{CS}$) value. The signature logical index value may be further used to transport logical messages. The PHY time cyclical shift values ($N_{CS}$) associated with the signature logical indexes may be represented in the table below:

TABLE 2

| PHY $N_{CS}$ Value | Signature Logical Index |
|---|---|
| 0 | 00 |
| 13 | 01 |
| 26 | 02 |
| 39 | 03 |
| 52 | 04 |
| 65 | 05 |
| 78 | 06 |
| 91 | 07 |
| 104 | 08 |
| 117 | 09 |
| 130 | 0A |
| 143 | 0B |
| 156 | 0C |
| 169 | 0D |
| 182 | 0E |
| 195 | 0F |
| 208 | 10 |
| 221 | 11 |
| 234 | 12 |
| 247 | 13 |
| 260 | 14 |
| 273 | 15 |
| 286 | 16 |
| 299 | 17 |
| 312 | 18 |
| 325 | 19 |
| 338 | 1A |

TABLE 2-continued

| PHY $N_{CS}$ Value | Signature Logical Index |
|---|---|
| 351 | 1B |
| 364 | 1C |
| 377 | 1D |
| 390 | 1E |
| 403 | 1F |
| 416 | 20 |
| 429 | 21 |
| 442 | 22 |
| 455 | 23 |
| 468 | 24 |
| 481 | 25 |
| 494 | 26 |
| 507 | 27 |
| 520 | 28 |
| 533 | 29 |
| 546 | 2A |
| 559 | 2B |
| 572 | 2C |
| 585 | 2D |
| 598 | 2E |
| 611 | 2F |
| 624 | 30 |
| 637 | 31 |
| 650 | 32 |
| 663 | 33 |
| 676 | 34 |
| 689 | 35 |
| 702 | 36 |
| 715 | 37 |
| 728 | 38 |
| 741 | 39 |
| 754 | 3A |
| 767 | 3B |
| 780 | 3C |
| 793 | 3D |
| 806 | 3E |
| 819 | 3F |

Figure 7A:
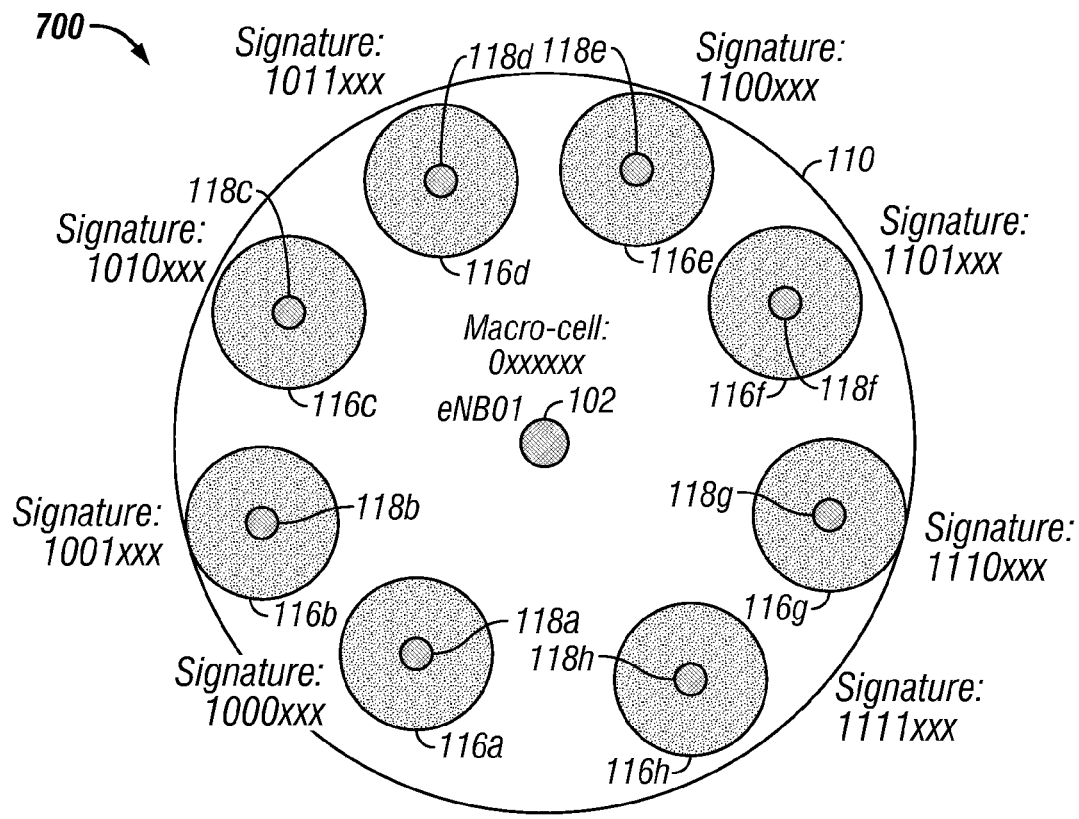
FIG. 7A illustrates an example cell cluster with an OSC topology configured to optimize the PRACH random access signature set allocation, in accordance with one embodiment of the present disclosure.

FIG. 7A illustrates an example cell 110 cluster 700 with OSC 116 topology configured to optimize PRACH random access signature set allocation, in accordance with one embodiment of the present disclosure. In the current example, cluster 700 may include eight OSCs 116, e.g., OSCs 116a-h. OSCs 116a-h may share one PRACH ZC root. Each ZC root's cyclic shift may be associated with a logical index for a particular $N_{CS}$. The pool of time shifts of the same ZC root may be shared among all OSCs 116a-h covered by cell 110 without being re-used. Thus, instead of utilizing one ZC root for each OSC 116, all OSCs 116 within cell 110 may share one ZC root, if sixteen or less OSCs 116 within cell 110, or two ZC roots if there are more than sixteen OSCs 116 within cell 110.

In some embodiments of the present disclosure, mBS 102 of cluster 700 may be given the designation Evolved Node-B 01 (eNB01) and may have a radius of approximately 3.5 kilometers or approximately three kilometers. Each of scBS 118a-h within each OSCs 116a-h, respectively, all located within the coverage of cell 110 may be given the designation eNB01.00-eNB01.07, respectively, and may have a radius of less than approximately 0.79 kilometers or approximately 0.5 kilometers. Additionally, in some embodiments, the sixty-four random access signatures employed by mBS 102 may be logically appended to the sixty-four signatures shared by scBSs 118a-h associated with OSCs 116a-h, respectively. Such an allocation may result in a total of one hundred and twenty eight logical indexes. Utilizing one ZC root (designated as "u+3") for scBS 118a-h and three ZC roots for mBS 102 (designated as "u," "u+1," and "u+2"), the following time shift assignation may be employed:

TABLE 3

| Base station | ZC Root Index | Signature Logical Indexes (Hex) | $N_{CS}$ Index Count | PHY $N_{CS}$ Value (n) |
|---|---|---|---|---|
| eNB01 R = 3 km | u | 00 ... 07 | 0 ... 7 | 0, 32, 64, 96, 128, 160, 192, 224, 256 |
| | u | 08 ... 0F | 8 ... 15 | 288, 320, 352, 384, 416, 448, 480, 512 |
| | u | 10 ... 17 | 16 ... 23 | 544, 576, 608, 640, 672, 704, 736, 768 |
| | u + 1 | 18 ... 1F | 24 ... 31 | 0, 32, 64, 96, 128, 160, 192, 224, 256 |
| | u + 1 | 20 ... 27 | 32 ... 39 | 288, 320, 352, 384, 416, 448, 480, 512 |
| | u + 1 | 28 ... 2F | 40 ... 47 | 544, 576, 608, 640, 672, 704, 736, 768 |
| | u + 2 | 30 ... 37 | 48 ... 55 | 0, 32, 64, 96, 128, 160, 192, 224, 256 |
| | u + 2 | 38 ... 3F | 56 ... 63 | 288, 320, 352, 384, 416, 448, 480, 512 |
| eNB01.00 R = 0.5 km | u + 3 | 40 ... 47 | 64 ... 71 | 0, 13, 26, 39, 52, 65, 78, 91 |
| eNB01.01 R = 0.5 km | u + 3 | 48 ... 4F | 72 ... 79 | 104, 117, 130, 143, 156, 169, 182, 195 |
| eNB01.02 R = 0.5 km | u + 3 | 50 ... 57 | 80 ... 87 | 208, 221, 234, 247, 260, 273, 286, 299 |
| eNB01.03 R = 0.5 km | u + 3 | 58 ... 5F | 88 ... 95 | 312, 338, 351, 364, 377, 390, 403, 429 |
| eNB01.04 R = 0.5 km | u + 3 | 60 ... 67 | 96 ... 103 | 416, 442, 455, 468, 481, 494, 507, 520 |
| eNB01.05 R = 0.5 km | u + 3 | 68 ... 6F | 104 ... 111 | 533, 546, 559, 572, 585, 598, 611, 624 |
| eNB01.06 R = 0.5 km | u + 3 | 70 ... 77 | 112 ... 119 | 604, 637, 650, 663, 676, 689, 702, 715 |
| eNB01.07 R = 0.5 km | u + 3 | 78 ... 7F | 120 ... 127 | 728, 741, 754, 767, 780, 793, 806, 819 |

Further, in some embodiments of the present disclosure, when the amount of OSCs 116 per cell 110 is greater than sixteen, the amount of random access signatures allocated for all OSCs 116 may be increased from sixty-four random access signatures to one hundred and twenty-eight random access signatures. In this case, the additional signatures may be incorporated by logically adding two ZC roots to the ZC root pool required by mBS 102 for cell 110. For example, sixty-four signatures may be employed by mBS 102 and an additional one hundred and twenty-eight signatures may be employed by OSCs 116 generating a total of one hundred and ninety-six random access signatures. In some embodiments of the present disclosure, if the number of OSCs 116 per cell 110 is greater than thirty-two, then the number of ZC roots may be increased in the same manner as described above, e.g., by adding one ZC root per sixteen OSCs 116 and corresponding multiples of sixty-four signatures. The following table illustrates the possible immunity cluster size and corresponding PRACH immunity radius in a time aligned co-channel OSC 116 configuration by sharing of time shifted signatures of one or more ZC roots:

TABLE 4

| OSCs 116 per cell 110 | mBS 102 ZC Roots (R = 3 km) | | Co-located mBS 102 and OSCs 116 ZC Roots (R = 3 km) | | Total mBS 102 + OSCs 116 | PRACH Immunity | PRACH Immunity |
|---|---|---|---|---|---|---|---|
| | scBS | mBS | scBS | mBS | ZC Roots | Cluster Size | Radius |
| 0 | 0 | 3 | 0 | 9 | 9 | 93 | 8 R (24 km) |
| 8 | 1 | 3 | 3 | 9 | 12 | 69 | 8 R (24 km) |
| 16 | 1 | 3 | 3 | 9 | 12 | 69 | 8 R (24 km) |
| 32 | 2 | 3 | 6 | 9 | 15 | 55 | 5 R (15 km) |

For example, in a cluster with sixteen OSCs 116 per cell 110, the cluster size of cells 110 that may be accommodated without having to reuse a PRACH signature set may be approximately sixty-nine cells 110. The corresponding PRACH immunity radius may be approximately 8R.

Thus, in some embodiments of the present disclosure, improvements may be realized in terms of the required PRACH immunity radius in a time aligned co-channel OSC 116 configuration by sharing of time shifted signatures of one or more ZC roots for two or more OSCs 116 (shown with reference to Table 4) in contrast to allocating one ZC root per mBS 102 and scBS 118 (shown with reference to Table 1). Accordingly, the following improvements may be realized with respect to an optimized allocation (shown with reference to Table 4) and a non-optimized allocation (shown with reference to Table 1):

TABLE 5

| OSCs 116 per cell 110 | Non-optimized PRACH Immunity Radius | Optimized PRACH Immunity Radius | Improvement |
|---|---|---|---|
| 8 | 3.7 R | 8.0 R | X 2.16 |
| 16 | 3.7 R | 8.0 R | X 2.16 |
| 32 | 2.0 R | 5.0 R | X 2.5 |

Figure 7B:
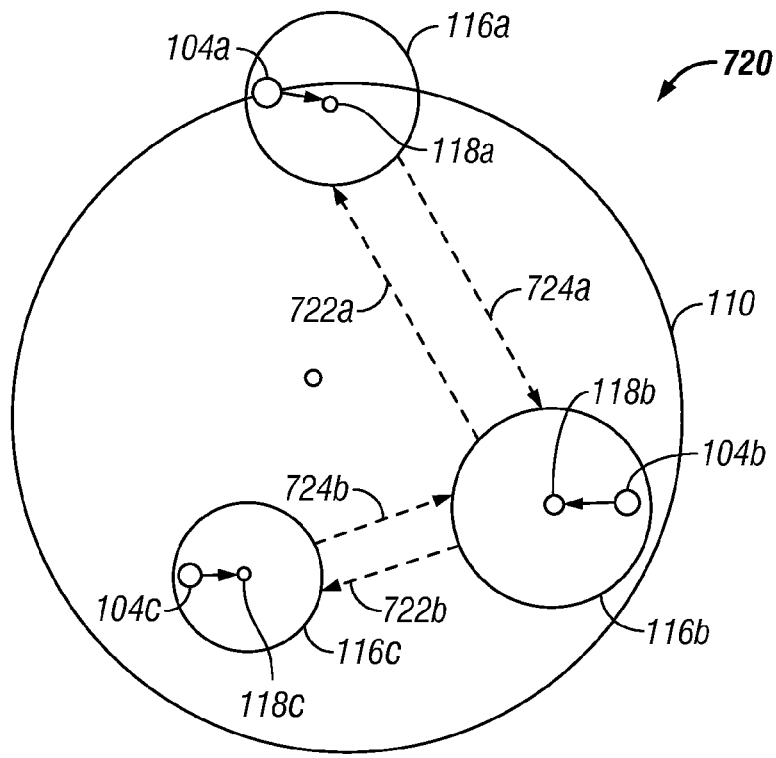
FIG. 7B illustrates an example network having a semi-static PRACH random access signature set scheduling configuration, in accordance with one embodiment of the present disclosure.

FIG. 7B illustrates an example network 720 having a semi-static PRACH random access signature set scheduling configuration, in accordance with one embodiment of the present disclosure. In such a configuration, correlation may be made between complementary residential and business traffic patterns of two OSCs 116. As a result, part or all random access signature sets may be loaned from one OSC to another OSC during different time periods provided complementary traffic patterns are employed. For example, scBS 118b associated with OSC 116b may be configured within or proximate an enterprise and may be utilized primarily or exclusively by endpoints 104 associated with a business. Additionally, scBSs 118a and 118c associated with OSC 116a and 116c, respectively, may be configured within or proximate homes and may be utilized primarily or exclusively by endpoints 104 associated with a home and residential traffic. Many businesses may experience the majority of their network activity during the workday while many residential networks may experience the majority of their network activity in the evenings and on weekends. Allocation of signature sets may be scheduled such that the signature sets maybe allocated between residential and business networks on a semi-static basis to accommodate traffic peaks within each OSC 116. For example, during the workday, residential OSCs, such as OSCs 116a and 116c, each employing eight PRACH signatures, may loan four PRACH signatures each to a business OSC, such as OSC 116b as shown by directional arrows 724a and 724b, respectively. Therefore, OSC 116b may utilize a PRACH signature pool of twenty-four signatures during the workday (assuming an initial allocation of sixteen signatures). In the evenings and/or on weekends, signature sets may be allocated from OSC 116b to OSC 116a and 116c as shown by directional arrows 722a and 722b, respectively. For instance, OSC 116b may loan six signatures to each one of OSC 116a and 116c. Therefore, OSC 116a and OSC 116c may employ fourteen signatures during evenings and weekends, while OSC 116b may operate with a reduced PRACH capacity of two signatures during the same time periods.

Figure 8:
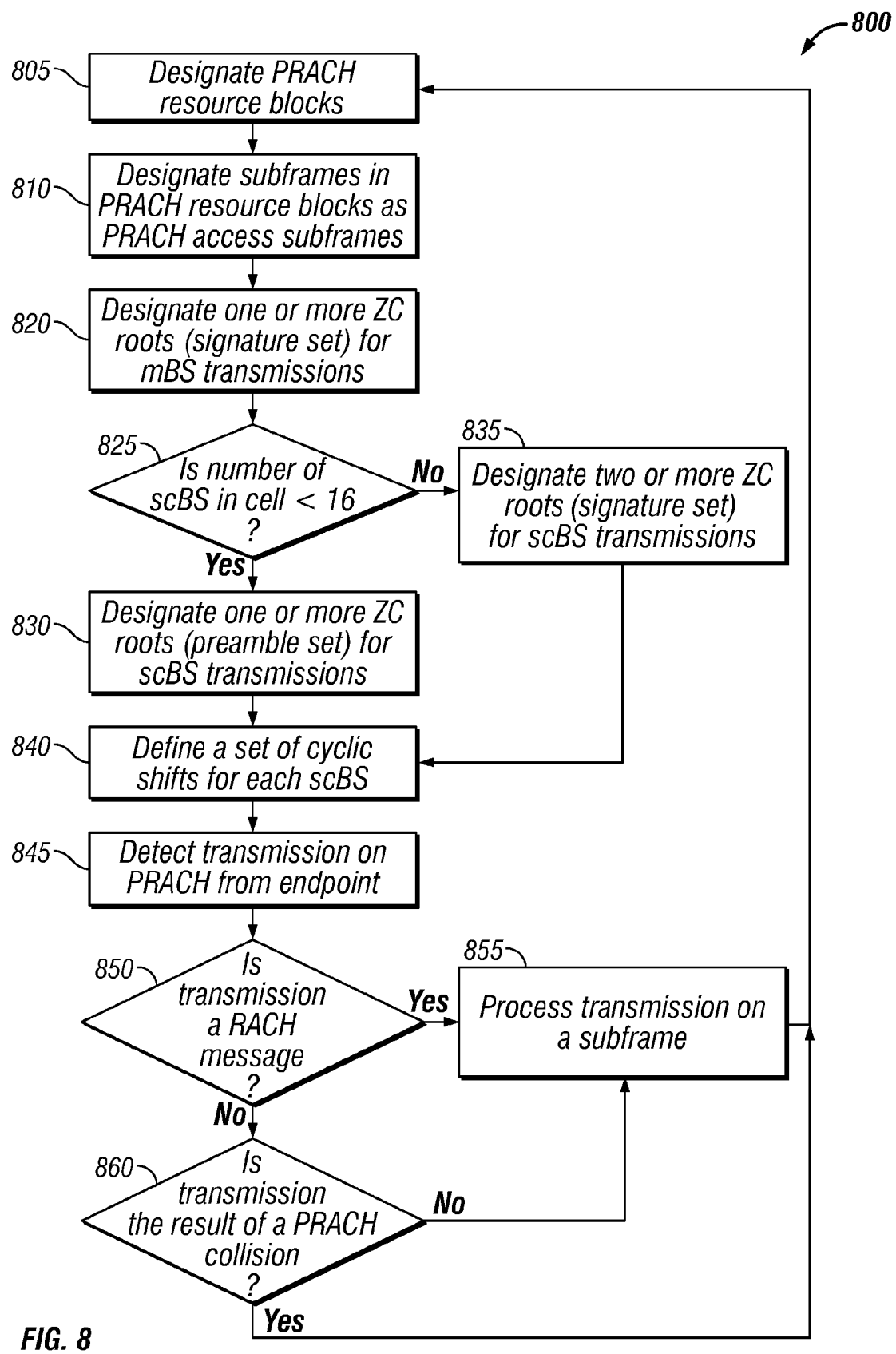
FIG. 8 illustrates a flow chart of an example method for random access signature set optimization in a wireless network, in accordance with one embodiment of the present disclosure.

FIG. 8 illustrates a flow chart of an example method 800 for random access signature set optimization in a wireless network, such as network 600 of FIG. 6, in accordance with one embodiment of the present disclosure. The steps of method 800 may be performed by various computer programs, models or any combination thereof, configured to simulate and design systems for random access signature set optimization employing OSC topology. The programs and models may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer-readable media. For illustrative purposes, method 800 is described with respect to network 600 of FIG. 6; however, method 800 may be used for random access signature set optimization on any suitable network. Further, although discussed with reference to a network, portions or all of method 800 may be executed by a component of network 100 including mBS 102, server 108, scBS 118, concentrator 130 and/or any other suitable component.

Method 800 may start and at step 805, a network, may designate resource blocks as PRACH resource blocks. For example, with reference to FIG. 4, mBS 102 may designate resource blocks forty-seven through fifty-two for PRACH access. Method 800 may proceed to step 810.

At step 810, the network may designate random access subframes in the PRACH resource blocks as PRACH access subframes. For example, with reference to FIG. 4, subframe two may be designated as PRACH access by mBS 102, scBS 118a, and scBS 118b. Subframe two may be time aligned across all base stations. Additionally, for a semi-static allocation, discussed with reference to FIG. 7B, OSC 116 with an increased number of users that may demand a higher access capability, there may be PRACH subframes that may be assigned for particular times of the day or may be assigned dynamically as the number of endpoints 104 attempting access increases or decreases. Method 800 may proceed to step 820.

At step 820, one or more ZC roots may be designated for mBS access. For example, a first set of three ZC roots, e.g., three sets of sixty-four random access signatures, may be designated for co-located mBS 102 within cell 110 with a radius of approximately three kilometers, as discussed with reference to FIG. 7A. Method 800 may proceed to step 825.

At step 825, it may be determined if there are less than sixteen scBSs in a cell. If there are less than sixteen scBSs, then method 800 may proceed to step 830. At step 820, an additional ZC root, or random access signature set, may be defined for scBS transmissions. For example, a second set of sixty-four signatures may be designated for sharing among scBSs 118 within cell 110, as discussed with reference to FIG. 7A. Further, if at step 825 it is determined there are sixteen or more scBSs in a cell, then method 800 may proceed to step 835 and two or more ZC roots, or random access signature sets, may be designated for sharing among scBSs 118 within the coverage area of cell 110. If there are more than thirty-one OSCs 116 per cell 110, three ZC roots may be shared among these OSCs 116. Method 800 may proceed to step 840.

At step 840, a set of ZC root cyclic shift (signatures) may be defined for each scBS. The definition may depend in part on the expected cell radius of the respective scBS. For example, with reference to FIG. 7A and Tables 3 and 4, a ZC root cyclic shift may be associated with each OSC 116a-h. Method 800 may proceed to step 845.

At step 845, the network may detect a transmission on the PRACH from an endpoint, such as endpoint 104. At step 850, the base station receiving the transmission may determine if the transmission is a RACH message. If the message is a RACH message, the base station may process the transmission on a subframe at step 855. For example, mBS 102 may process the RACH message on a designated PRACH access subframe, such as subframe two of resource block 406 shown in FIG. 4. Method 800 may then proceed back to step 805. If the detected message is not a RACH message, then method 800 may proceed to step 860.

At step 860, the base station may determine if the message is a result of a PRACH collision. If the message is the result of a PRACH collision, method 800 may return to step 805 and recalculate and re-designate the amount of PRACH resources required due to the increased network access demand. If the message is not the result of a PRACH collision, then the base station may receive the message on a data subframe, e.g., a subframe not designated for PRACH access at step 855. Method 800 may then proceed back to step 805.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the invention.

What is claimed is:

1. A method for managing a wireless network traffic comprising:
   designating a first resource block of a macro base station and a second resource block of a first small cell base station for access by a physical random access channel (PRACH);
   designating a first random access subframe associated with the first resource block for access by a random access channel message, the first random access subframe having a first allocation of random access signatures configured to receive a plurality of random access requests and based on a first root of a function;
   designating a second random access subframe associated with the second resource block for access by a random access channel message, the second random access subframe time-aligned with the first random access subframe, the second random access subframe having a second allocation of random access signatures configured to receive a plurality of random access requests and based on a second root of the function;
   designating a third resource block associated with a second small cell base station; and
   designating a third random access subframe associated with the third resource block for access by a random access channel message, the third random access subframe time-aligned with the second random access subframe and having a third allocation of random access signatures configured to receive a plurality of random access requests, the third allocation of random access signatures is based on the second root of the function and is shifted cyclically from the second allocation of random access signatures.

2. The method of claim 1, wherein the first resource block is time-aligned with the second resource block, the first resource block utilizing intra-band frequency resources, the second resource block utilizing the same intra-band frequency resources as the first resource block.

3. The method of claim 2, wherein the third resource block utilizes intra-band frequency resources.

4. The method of claim 3, wherein the third resource block is time-aligned with the second resource block, and the third resource block utilizing the same intra-band frequency resources as the second resource block.

5. The method of claim 1, further comprising:
   receiving a random access message at the macro base station over a random access subframe from an endpoint, the random access message received on the PRACH using the wireless network, the random access message attempting to access the first designated random access subframe;
   determining if the random access message is a random access channel message; and
   in response to determining the random access message is the random access channel message, processing the random access message on the first designated random access subframe.

6. The method of claim 1, further comprising:
   receiving a random access message at the first small cell base station over a random access subframe from an endpoint, the random access message received on the PRACH using the wireless network, the random access message attempting to access the second designated random access subframe;
   determining if the random access message is a random access channel message; and
   in response to determining the random access message is the random access channel message, processing the random access message on the second designated random access subframe.

7. The method of claim 1, further comprising in response to a plurality of small cell base stations of the wireless network exceeding a predetermined amount, designating a plurality of random access signature allocations based on a third root of the function, each of the plurality of random access signature allocations shifted cyclically from each of the other random access signature allocations, the plurality of small cell base stations configured within a cell of the macro base station.

8. The method of claim 7, wherein the plurality of random access signature allocations are derived from cyclically time-shifting a Zadoff-Chu root.

9. The method of claim 1, wherein portions of the second allocation of random access signatures and portions of the third allocation of random access signatures are loaned on a semi-static basis.

10. One or more non-transitory computer-readable media embodying logic that, when executed by a processor, is configured to perform operations comprising:
designating a first resource block of a macro base station and a second resource block of a first small cell base station for access by a physical random access channel (PRACH);
designating a first random access subframe associated with the first resource block for access by a random access channel message, the first random access subframe having a first allocation of random access signatures configured to receive a plurality of random access requests and based on a first root of a function;
designating a second random access subframe associated with the second resource block for access by a random access channel message, the second random access subframe time-aligned with the first random access subframe, the second random access subframe having a second allocation of random access signatures configured to receive a plurality of random access requests and based on a second root of the function;
designating a third resource block associated with a second small cell base station; and
designating a third random access subframe associated with the third resource block for access by a random access channel message, the third random access subframe time-aligned with the second random access subframe and having a third allocation of random access signatures configured to receive a plurality of random access requests, the third allocation of random access signatures is based on the second root of the function and is shifted cyclically from the second allocation of random access signatures.

11. The one or more media of claim 10, wherein the first resource block is time-aligned with the second resource block, the first resource block utilizing an intra-band frequency resource, the second resource block utilizing the intra-band frequency resource.

12. The one or more media of claim 11, wherein the third resource block utilizes the intra-band frequency resources.

13. The method of claim 12, wherein the third resource block is time-aligned with the second resource block, and the third resource block utilizing the same intra-band frequency resources as the second resource block.

14. The one or more media of claim 10, the operations further comprising;
receiving a random access message at the macro base station over a random access subframe from an endpoint, the random access message received on the PRACH using the wireless network, the random access message attempting to access the first designated random access subframe;
determining if the random access message is a random access channel message; and
in response to determining the random access message is the random access channel message, processing the random access message on the first designated random access subframe.

15. The one or more media of claim 10, the operations further comprising;
receiving a random access message at the first small cell base station over a random access subframe from an endpoint, the random access message received on the PRACH using the wireless network, the random access message attempting to access the second designated random access subframe;
determining if the random access message is a random access channel message; and
in response to determining the random access message is the random access channel message, processing the random access message on the second designated random access subframe.

16. The one or more media of claim 10, the operations further comprising in response to a plurality of small cell base stations of the wireless network exceeding a predetermined amount, designating a plurality of random access signature allocations based on a third root of the function, each of the plurality of random access signature allocations shifted cyclically from each of the other random access signature allocations, the plurality of small cell base stations configured within a cell of the macro base station.

17. The one or more media of claim 16, wherein the plurality of random access signature allocations are derived from cyclically time-shifting a Zadoff-Chu root.

18. The one or more media of claim 10, wherein portions of the second allocation of random access signatures and portions of the third allocation of random access signatures are loaned on a semi-static basis.

* * * * *